United States Patent
Nastasi et al.

[11] Patent Number: 6,138,957
[45] Date of Patent: Oct. 31, 2000

[54] SWEPT-BACK WINGS WITH AIRFLOW CHANNELING

[75] Inventors: Richard F. Nastasi, Commack; Walter S. Soeder, Patchogue, both of N.Y.

[73] Assignee: Northrop Grumman Corporation, Los Angeles, Calif.

[21] Appl. No.: 09/221,183

[22] Filed: Dec. 23, 1998

[51] Int. Cl.⁷ .................................. B64C 3/44; B64C 3/00
[52] U.S. Cl. .................................. 244/219; 244/35 R
[58] Field of Search .................................. 244/35 R, 36, 244/219, 199, 200, 130

[56] References Cited

U.S. PATENT DOCUMENTS

| | | | |
|---|---|---|---|
| D. 314,366 | 2/1991 | Waasland et al. | D12/333 |
| 1,180,271 | 4/1916 | Tarbox | 244/231 |
| 1,412,455 | 4/1922 | Crowell et al. | 244/219 |
| 1,480,327 | 1/1924 | Wisenant | 244/35 R |
| 1,493,522 | 5/1924 | Crowell et al. | 244/219 |
| 1,752,378 | 4/1930 | Gobble | 244/35 R |
| 1,766,284 | 6/1930 | Danko | 244/35 R |
| 1,791,233 | 2/1931 | Breguet | 244/219 |
| 1,870,514 | 8/1932 | Kontos | 244/35 R |
| 1,918,897 | 7/1933 | Colburn | 244/219 |
| 2,120,250 | 6/1938 | Houston | 244/219 |
| 2,885,161 | 5/1959 | Kerker et al. | 244/42 |
| 2,894,703 | 7/1959 | Hazen et al. | 244/42 |
| 3,129,908 | 4/1964 | Harper | 244/219 |
| 3,136,501 | 6/1964 | Barber | 244/219 |
| 3,298,636 | 1/1967 | Arnholdt | 244/41 |
| 3,366,348 | 1/1968 | Lemoigne | 244/41 |
| 3,706,430 | 12/1972 | Kline et al. | 244/35 |
| 4,434,957 | 3/1984 | Moritz | 244/35 |
| 4,530,301 | 7/1985 | Latham | 244/219 |
| 4,706,910 | 11/1987 | Walsh et al. | 244/130 |
| 4,932,612 | 6/1990 | Blackwelder et al. | 244/207 |
| 5,114,099 | 5/1992 | Gao | 244/130 |
| 5,171,623 | 12/1992 | Yee | 428/156 |
| 5,378,524 | 1/1995 | Blood | 428/141 |
| 5,395,071 | 3/1995 | Felix | 244/35 |
| 5,505,409 | 4/1996 | Wells et al. | 244/130 |
| 5,531,407 | 7/1996 | Austin et al. | 244/219 |

*Primary Examiner*—Peter M. Poon
*Assistant Examiner*—Fredrick T. French, III
*Attorney, Agent, or Firm*—Terry J. Anderson; Karl J. Hoch, Jr.

[57] ABSTRACT

In accordance with the present invention, there is provided a pair of opposing wings for providing aircraft directional stability of a delta-shaped aircraft having a longitudinal axis. Each wing is provided with a substantially straight swept-back leading edge. Each wing is further provided with a lower surface which extends aft from the leading edge. A lower airflow channeling portion is formed into the lower surface. The lower airflow channeling portion is generally elongate and concave and is disposed substantially parallel to the longitudinal axis of the aircraft for channeling airflow substantially parallel thereto.

18 Claims, 2 Drawing Sheets

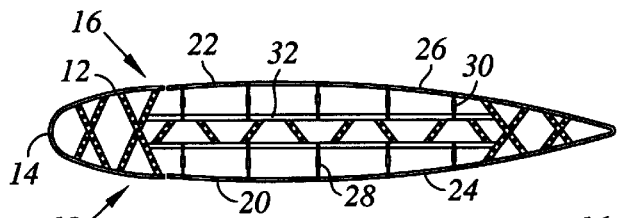
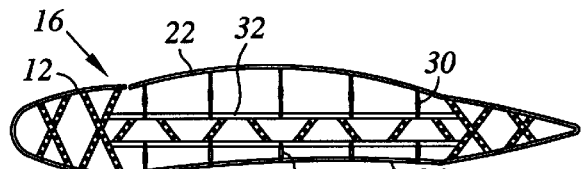
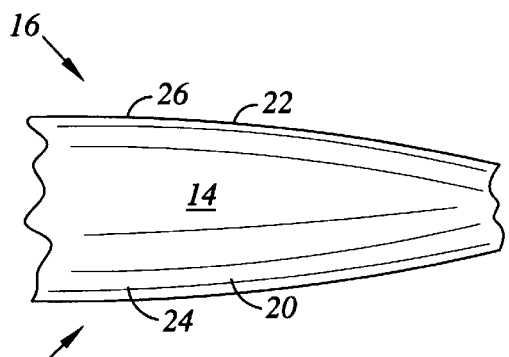
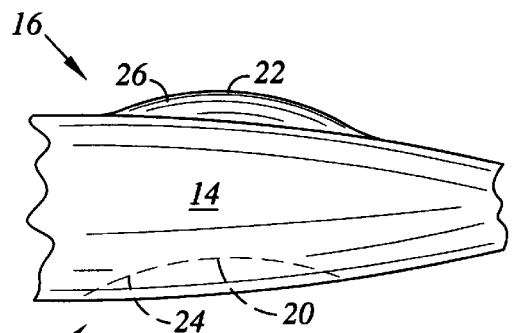
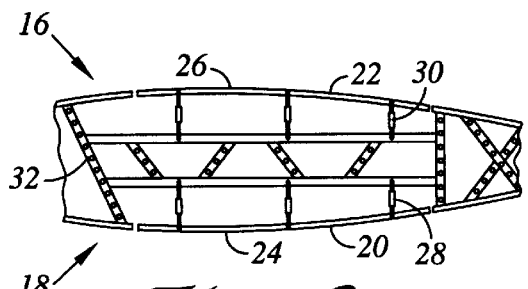
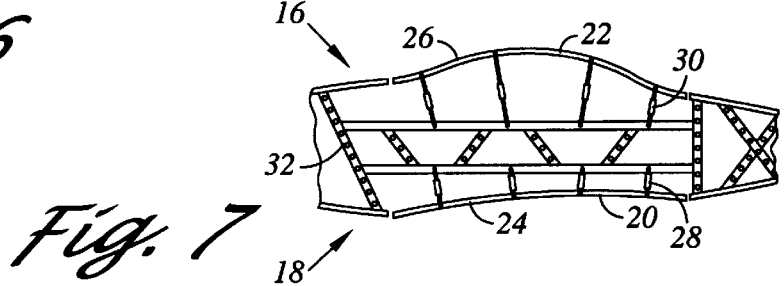

6,138,957

SWEPT-BACK WINGS WITH AIRFLOW CHANNELING

FIELD OF THE INVENTION

The present invention relates generally to air vehicles, and more particularly to a delta-shaped aircraft having wings with straight leading edges and arced center portions for directional stability.

BACKGROUND OF THE INVENTION

Delta-shaped aircraft are characterized by highly swept-back wings and a relatively low aspect ratio which results in a generally triangular planform. While conventionally shaped aircraft are defined by a central fuselage with laterally protruding wings, delta-shaped aircraft have an integrated fuselage and wing configuration. In this respect, typically the modern "stealthy" type of delta-shaped aircraft have an aerodynamic lifting surface which is defined by a central fuselage which smoothly blends with highly swept-back wings. In fact, because of this smooth integration, these aircraft are contemplated as having only a single wing and these aircraft are sometimes referred as being a "flying wing." Some present examples of delta-shaped aircraft include the U.S. military's B-2 bomber and the F-117 stealth fighter.

When designing a low radar observable aircraft it is desirable to align the leading edges of the aircraft when observed in the plan view, i.e., topwise or bottomwise. This tends to "group" together detected radar spikes such that the spikes occur at fewer discrete angles, and provides lower off-spike signatures. It is further desirable to maintain long edges in order to provide as narrow an edge spike as possible. This design methodology is known as "spike and fuzzball," and results in radar signatures that are characterized by a few large narrow spikes at specific viewing angles combined with a "noisy" low magnitude "fuzzball" signature elsewhere.

It is further desirable to align the leading edges of the aircraft wings in a common horizontal plane. Where the leading edges are not aligned in the horizontal plane, the detected radar spikes from these leading edges tend to appear less and less aligned as the aircraft is observed from greater and greater elevation angles. This effect is known as "spike walk", and arises due to purely geometrical considerations. As such, as one of ordinary skill in the art can appreciate, the failure to align the leading edges in the horizontal plane may increase the aircraft deflectability at non-zero elevation angles from both a spike and fuzzball perspective.

As one of ordinary skill in the art will further appreciate, aircraft must typically reduce their speed when performing landing operations. To perform this function, conventional aircraft typically employ flaps which are rotably attached to the trailing edges of the wings. The flaps are deflected downward, and in some configurations the flaps are also extended afterward, in order to produce drag, thereby slowing down the aircraft to required landing flight speeds.

The modern stealthy delta-aircraft as described above, however, do not have traditional flaps at the trailing edges of the wings. For example, in the case of the B-2 stealth bomber, the aircraft does not even have downwardly deflectable or afterward extendable flaps for producing drag and slowing the aircraft. These aircraft typically have angled elevons and rudders for their control surfaces which are mounted to the trailing edge of the wing. Among other design constraints, this is primarily due to radar signature mitigation reasons and the inability to balance the resulting pitching moments. As such, in addition to reducing engine power, these aircraft reduce their speed for landing operations by approaching the landing area at a relatively high angle-of-attack or nose-up in order to increase drag.

As one of ordinary skill in the art can appreciate, the operation of an aircraft at a high angle-of-attack negatively impacts the directional stability. This is inherently problematic for delta-shaped aircraft designs due to their geometry. In order to achieve directional stability, however, the design of delta-shaped aircraft typically must use aerodynamic control surfaces, even at the undesirable cost of increasing the radar observable signature of the aircraft. Such control surfaces may include, for example, tail fins and rudders.

As such, based upon the foregoing, there exists a need in the art for an improved method and device, for use with a delta-shaped aircraft which improves directional stability without substantially interfering with the aircraft aerodynamic and radar detectability characteristics in comparison to the prior art.

SUMMARY OF THE INVENTION

In accordance with the present invention, there is provided a pair of opposing wings for providing aircraft directional stability of a delta-shaped aircraft having a longitudinal axis. Each wing is provided with a substantially straight swept-back leading edge. Each wing is further provided with a lower surface which extends aft from the leading edge. A lower airflow channeling portion is formed into the lower surface. The lower airflow channeling portion is generally elongate and concave and is disposed substantially parallel to the longitudinal axis of the aircraft for channeling airflow substantially parallel thereto.

In the preferred embodiment, the leading edges of the wings are substantially disposed in a common horizontal plane. The wings may be further provided with an upper surface having an upper airflow channeling portion formed out of the upper surface. The upper airflow channeling portion is generally elongate and convex and is disposed substantially parallel to the longitudinal axis of the aircraft for channeling airflow substantially parallel thereto.

In another embodiment of the present invention, the lower surface is configured to move between normal and retracted positions. When in the retracted position, a lower airflow channeling portion is formed in the lower surface, as described above. Similarly, the upper surface is configured to move between normal and extended positions. When in the extended position, an upper airflow channeling portion is formed out of the upper surface, as described above. Preferably, actuator devices move the upper and lower surfaces between the normal and the respective extended and retracted positions, hydraulic devices, for example.

The aircraft wings constructed in accordance with the present invention present numerous advantages not found in the related prior art. In this respect, the present invention is particularly adapted to provide directional stability to the aircraft. This is especially the case which the aircraft is operated at a relatively high angle-of-attack because this exposes the lower surface of the wings to a greater amount oncoming airflow. As the oncoming airflow impinges against the lower surface of the wings, the airflow is directed and channeled into and through the lower airflow channeling portion thereof. Such channeling is contemplated to result in restorative forces which facilitate directional stability of the aircraft in the direction of flight. The upper airflow channeling portion is contemplated to have a similar effect, but with external airflow passing around the upper airflow channeling portion. As a result, the aircraft employing the wings of the present invention may be less reliant upon use of aerodynamic control surfaces for directional stability in comparison to those in the prior art. As such, the present invention represents an advance in the art.

BRIEF DESCRIPTION OF THE DRAWINGS

These, as well as other features of the present invention, will become more apparent upon reference to the drawings wherein:

FIG. 4 is a cross-sectional view of the wing of the present invention as seen along axis 4—4 of FIG. 1;

FIG. 4a is a cross-sectional view of the wing of the present invention as seen in FIG. 4 with the upper and lower airflow channeling portions in their respective operable positions;

FIG. 5 is a front view of the wing of the present invention as seen along axis 5—5 of FIG. 1;

FIG. 5a is a front view of the wing of the present invention as seen in FIG. 5 with the upper and lower airflow channeling portions in their respective operable positions;

FIG. 6 is a front cross-sectional view of the wing of the present invention as seen along axis 6—6 of FIG. 1; and FIG. 7 is a front cross-sectional view of the wing of the present invention as seen in FIG. 6 with the upper and lower airflow channeling portions in their respective operable positions.

DETAILED DESCRIPTION OF THE PREFERRED EMBODIMENT

Figure 1:
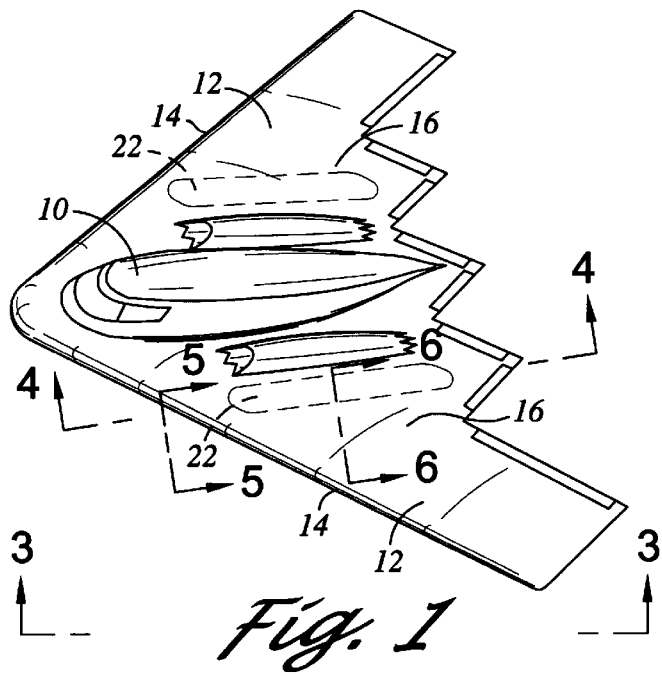
FIG. 1 is a top perspective view of a delta-shaped aircraft with the wings of the present invention.

Referring now to the drawings wherein the showings are for purposes of illustrating a preferred embodiment of the present invention only, and not for purposes of limiting the same, FIGS. 1–4, 4a, 5, 5a, 6 and 7 illustrate a system for providing directional stability to a swept-back wing aircraft 10 which is constructed in accordance with the present invention for providing aircraft directional stability.

Figure 2:
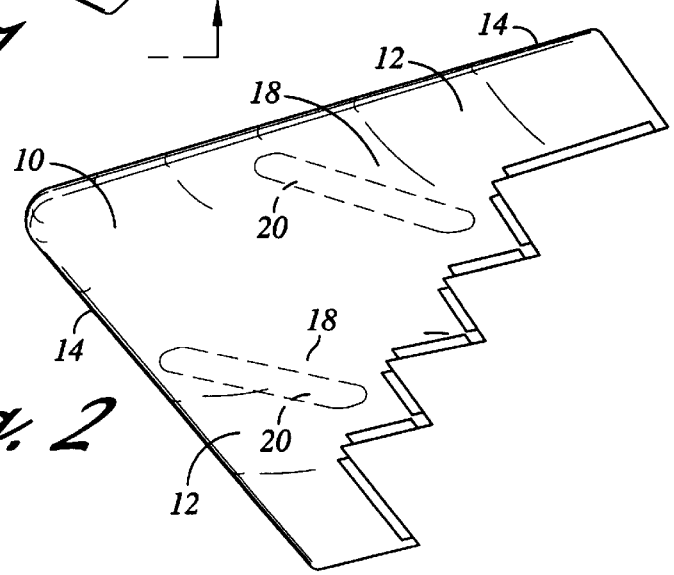
FIG. 2 is a bottom perspective view of the aircraft of FIG. 1.
Figure 3:
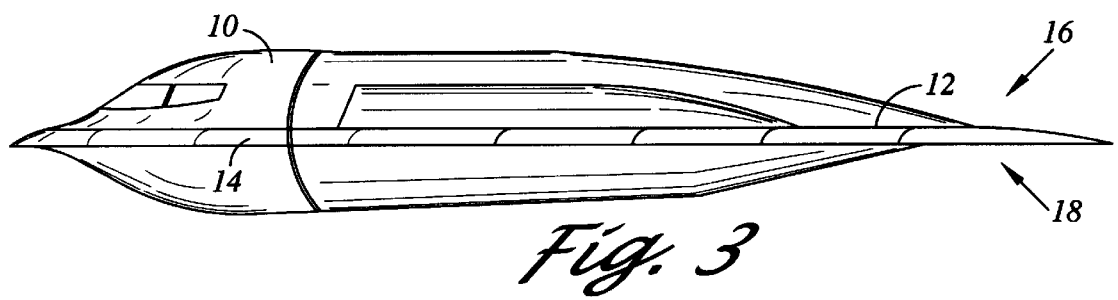
FIG. 3 is a side view of the aircraft of FIG. 1.

Referring now to FIGS. 1–3, there is depicted an exemplary aircraft 10 as respectively seen from the top and bottom perspective and side views. As can be seen, the aircraft 10 is generally characterized by a delta-shape. In this respect, in accordance with the present invention, the aircraft 10 is provided with a pair of opposing wings 12 which extend about a longitudinal axis of the aircraft 10. Each wing 12 is provided with a substantially straight swept-back leading edge 14. In the preferred embodiment, the leading edges 14 are substantially disposed in a common horizontal plane. As one of ordinary skill in the art will appreciate, such particular geometry and configuration of the leading edges 14 has significant radar signature implications, and thus contribute to the overall modern stealthy design of the aircraft 10.

The wings 12 are provided with upper and lower surfaces 16, 18 which extends aft from the leading edge 14. The lower surface 18 is provided with a lower airflow channeling portion 20 which is formed therein. Referring now to FIGS. 4a, 5a and 7, when in its operating position, the lower airflow channeling portion 20 is generally elongate and concave and is disposed substantially parallel to the longitudinal axis of the aircraft 10 for channeling airflow substantially parallel thereto.

Preferably, the upper surface 16 is provided with an upper airflow channeling portion 22 which is formed therein. When in its operating position, the upper airflow channeling portion 22 is generally elongate and convex and is disposed substantially parallel to the longitudinal axis of the aircraft 10 for channeling airflow substantially parallel thereto. It is contemplated that upper airflow channeling portion 22 diverts and directs airflow there around for providing further aircraft directional stability.

In another embodiment of the present invention, the lower surface 18 is configured to move between normal and retracted positions. When in the retracted position, a lower airflow channeling portion 20 is formed in the lower surface 18, as described above. In this respect, the lower surface 18 is provided with a lower flexible skin 24. The lower flexible skin 24 is sized and configured to retract to form the lower airflow channeling portion 20 of the lower surface 18. Similarly, the upper surface 16 is configured to move between normal and extended positions. When in the extended position, an upper airflow channeling portion 22 is formed out of the upper surface 16, as described above. In this respect, the upper surface 16 is provided with an upper flexible skin 26. The upper flexible skin 26 is sized and configured to expand and extend to form the upper airflow channeling portion 22 of the upper surface 16. It is contemplated that the material choice for the lower and upper flexible skins 24, 26 are durable and rigid enough so as to assume and maintain the desired form during flight conditions. In this respect, the lower and upper flexible skins 24, 26 are formed of materials which are well known to one of ordinary skill in the art and may be a polymeric material, for example.

Preferably lower and upper actuator devices 28, 30 move the lower and upper surfaces 18, 16 between the normal and the respective retracted and extended positions. Thus, movement of the lower flexible skin 24 is accomplished via the provision of the lower actuator device 28 which mechanically couples the lower flexible skin 24 to the wing internal structure 32 for moving the lower flexible skin 24 relative to the wing internal structure 32. Similarly, movement of the upper flexible skin 26 is accomplished via the provision of the upper actuator device 30 which mechanically couples the upper flexible skin 26 to the wing internal structure 32 for moving the upper flexible skin 26 relative to the wing internal structure 32. The lower and upper actuator devices 28, 30 are symbolically depicted in FIGS. 4, 4a, 6 and 7. The lower and upper actuator device 28, 30 may be hydraulic, pneumatic or electromechanical in nature. It is contemplated that the sizing and configuration of the actuator devices 28, 30 and supporting linkages are chosen from those well known to one of ordinary skill in the art. It is further contemplated that those devices and software which control the actuator devices 28, 30 are also chosen from those well known to one of ordinary skill in the art.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. In a delta-shaped aircraft having a longitudinal axis, a pair of opposing wings for providing aircraft directional stability, wherein each wing comprising:

a substantially straight swept-back leading edge;

a lower surface extending aft from the leading edge; and a lower airflow channeling portion formed into the lower surface, the lower airflow channeling portion being elongate and concave and having an airflow longitudinal axis, the airflow longitudinal axis being disposed substantially parallel to the aircraft for channeling airflow substantially parallel thereto.

2. The wings of claim 1 wherein the leading edges being substantially disposable in a common plane.

3. The wings of claim 1 wherein each wing further comprising an upper surface extending aft from the leading edge and an upper channeling portion formed out of the upper surface, the upper channeling portion being elongate and convex and having an airflow longitudinal axis, the airflow longitudinal axis being disposed substantially parallel to the longitudinal axis of the aircraft for channeling airflow substantially parallel thereto.

4. A delta-shaped aircraft having a longitudinal axis, the aircraft comprising:

a pair of opposing wings for providing aircraft directional stability, wherein each wing comprising:

a substantially straight swept-back leading edge;

a lower surface extending aft from the leading edge; and a lower airflow channeling portion formed into the lower surface, the lower airflow channeling portion being generally elongate and concave and having an airflow longitudinal axis, the airflow longitudinal axis being disposed substantially parallel to the longitudinal axis of the aircraft for channeling airflow substantially parallel thereto.

5. In a delta-shaped aircraft having a longitudinal axis, a pair of opposing wings for providing aircraft directional stability, wherein each wing comprising:

a substantially straight swept-back leading edge;

a lower surface extending aft from the leading edge, the lower surface having normal and retracted positions;

wherein the normal position the lower surface being generally planar; and wherein the operating position the lower surface defining a lower airflow channeling portion extending afterward from the leading edge, the lower airflow channeling portion being generally elongate and concave and having an airflow longitudinal axis, the airflow longitudinal axis being disposed substantially parallel to the longitudinal axis of the aircraft for channeling airflow substantially parallel thereto.

6. The wings of claim 5 wherein each wing further comprising an upper surface extending aft from the leading edge, the upper surface having normal and extended positions, wherein the normal position the upper surface being generally planar, wherein the extended position the upper surface defining an upper airflow channeling portion extending afterward from the leading edge, the upper airflow channeling portion being generally elongate and convex and having an airflow longitudinal axis, the airflow longitudinal axis being disposed substantially parallel to the longitudinal axis of the aircraft for channeling airflow substantially parallel thereto.

7. The wings of claim 6 wherein the upper surface being a flexible skin.

8. The wings of claim 7 wherein the flexible skin being formed of a polymeric material.

9. The wings of claim 6 wherein each wing further comprising an upper actuator device mechanically coupled to the upper portion for moving the upper portion between the normal and extended positions.

10. The wings of claim 9 wherein the upper actuator device is a hydraulic device.

11. The wings of claim 9 wherein each wing further comprising a lower actuator device mechanically coupled to the lower portion for moving the lower portion between the normal and retracted positions.

12. The wings of claim 9 wherein the upper and lower actuator device in each wing being the same device.

13. The wings of claim 5 wherein the lower surface being a flexible skin.

14. The wings of claim 13 wherein the flexible skin being formed of a polymeric material.

15. The wings of claim 5 wherein each wing further comprising a lower actuator device mechanically coupled to the lower airflow channeling portion for moving the lower airflow channeling portion between the normal and retracted positions.

16. The wings of claim 15 wherein the lower actuator device is a hydraulic device.

17. The wings of claim 5 wherein the leading edges being substantially disposable in a common plane.

18. A delta-shaped aircraft having a longitudinal axis, the aircraft comprising:

a pair of opposing wings for providing aircraft directional stability, wherein each wing comprising:

a substantially straight swept-back leading edge;

a lower surface extending aft from the leading edge, the lower surface having normal and retracted positions;

wherein the normal position the lower surface being generally planar; and wherein the retracted position the lower surface defining a lower airflow channeling portion extending afterward from the leading edge, the lower airflow channeling portion being generally elongate and concave and having an airflow longitudinal axis, the airflow longitudinal axis being disposed substantially parallel to the longitudinal axis of the aircraft for channeling airflow substantially parallel thereto.

* * * * *